(12) United States Patent
Abdulov

(10) Patent No.: US 10,955,550 B1
(45) Date of Patent: Mar. 23, 2021

(54) SYNCHRONIZATION OF MOTION-SENSITIVE ACOUSTIC SPEAKERS

(71) Applicant: TYMPHANY ACOUSTIC TECHNOLOGY (HUIZHOU) CO., LTD., Guangdong Province (CN)

(72) Inventor: Alexey Abdulov, Taipei (TW)

(73) Assignee: TYMPHANY ACOUSTIC TECHNOLOGY (HUIZHOU) CO., LTD., Huizhou (CN)

(*) Notice: Subject to any disclaimer, the term of this patent is extended or adjusted under 35 U.S.C. 154(b) by 0 days.

(21) Appl. No.: 16/707,548

(22) Filed: Dec. 9, 2019

(51) Int. Cl.
*H04S 7/00* (2006.01)
*G01S 15/52* (2006.01)
*H04R 3/12* (2006.01)

(52) U.S. Cl.
CPC .............. *G01S 15/523* (2013.01); *H04R 3/12* (2013.01); *H04R 2420/07* (2013.01); *H04S 7/30* (2013.01)

(58) Field of Classification Search
CPC .... H04R 3/12; H04R 2420/07; H04R 29/002; H04R 5/04; H04R 1/1041; H04S 7/30; H04S 7/303; H04S 7/305; H04S 7/302
USPC .............................. 381/303, 58–59, 300, 302
See application file for complete search history.

(56) References Cited

U.S. PATENT DOCUMENTS 9,344,792 B2 * 5/2016 Rundle ................. H04R 1/1083
9,648,409 B2 * 5/2017 Puskarich ............ H04R 1/1041
10,477,318 B2 * 11/2019 Hanes .................. H04B 1/3833
2013/0129102 A1 * 5/2013 Li ......................... H04M 9/082
                                                                                            381/71.1
2017/0214994 A1 * 7/2017 Gadonniex ............ H04R 1/105
2018/0164433 A1 6/2018 Mishima
2019/0025415 A1 1/2019 Suchy et al.
2019/0341955 A1 * 11/2019 Harper .................... G01S 7/524

FOREIGN PATENT DOCUMENTS

CN 208705472 U 4/2019

* cited by examiner

*Primary Examiner* — Disler Paul
(74) *Attorney, Agent, or Firm* — Muncy, Geissler, Olds & Lowe, P.C.

(57) ABSTRACT

A motion-sensitive acoustic speaker may include a housing; a transmitter associated with the housing, a receiver associated with the housing, a interface component associated with the housing, and a processing device. The processing device is configured to: cause the transmitter to emit a first motion detection signal having an active phase and an idle phase; detect movement in an environment of the primary motion-sensitive acoustic speaker; cause a change in a state of the interface component in response to detection of movement in the environment of the motion-sensitive acoustic speaker; detect a presence of a secondary motion-sensitive acoustic speaker in the environment of the motion sensitive acoustic speaker; determine an idle period associated with the idle phase of the second motion detection signal during which a transmitter associated with the secondary motion-sensitive acoustic speaker is not actively transmitting; and cause the transmitter of the motion-sensitive acoustic speaker to emit the first motion detection signal such that the active phase of the first motion detection signal occurs within the idle period.

22 Claims, 9 Drawing Sheets

SYNCHRONIZATION OF MOTION-SENSITIVE ACOUSTIC SPEAKERS

BACKGROUND

Technical Field

The present application generally relates to motion-sensitive acoustic speakers and in particular to the wireless synchronization of motion detection signals emitted by motion-sensitive acoustic speakers.

Background Information

Motion-sensitive devices may include any type of device capable of detecting moving objects, such as people in motion. These devices may be included in many different types of product systems and may utilize one or more technologies (e.g., infrared, microwave, ultrasonic, tomographic, video, etc.) to perform motion detecting functions. Some examples of systems that may benefit from motion sensing capabilities include automatic doors, lighting systems, security systems, consumer electronics, mobile devices, etc.

The motion detection sensors of a motion-sensitive device may include active sensors. In many cases, active sensors enable detection of motion by using detection signals that are emitted from a source and, in turn, received by the sensors after interaction with one or more moving objects. Difficulties may arise when more than one active sensor-based motion-sensitive device is operating in a common environment. For example, the motion detection signals emitted by one device may be received by sensors associated with other devices, which can interfere with or disrupt the motion detection capabilities of the other devices For example, where multiple devices are emitting motion detection signals in a particular environment, the signals received at the various devices may lead the devices to make inaccurate determinations regarding motion in the environment. Systems and methods are needed to address one or more of these challenges.

SUMMARY

Embodiments consistent with the present disclosure provide methods and devices for automatically and wirelessly synchronizing motion detection signals emitted and received by motion-sensitive acoustic speakers.

Consistent with the disclosed embodiments, a motion-sensitive acoustic speaker is disclosed. The motion-sensitive acoustic speaker may include a housing, at least one transmitter associated with the housing, at least one receiver associated with the housing, and at least one interface component associated with the housing. The at least one transmitter and the at least one receiver may be included in a common transceiver unit.

Consistent with the disclosed embodiments, the motion-sensitive acoustic speaker may further include at least one processing device configured to: cause the transmitter to emit a first motion detection signal having an active phase and an idle phase; detect, based on reflections associated with the active phase of the first motion detection signal received by the at least one receiver, movement in an environment of the primary motion-sensitive acoustic speaker; cause a change in a state of the interface component in response to detection of movement in the environment of the motion-sensitive acoustic speaker; detect, based on a second motion detection signal received by the at least one receiver, a presence of a secondary motion-sensitive acoustic speaker in the environment of the motion sensitive acoustic speaker, wherein the secondary motion-sensitive acoustic speaker is remotely located relative to the motion-sensitive acoustic speaker and wherein the second motion detection signal has an active phase and an idle phase; determine, based on analysis of the second motion detection signal, an idle period associated with the idle phase of the second motion detection signal during which a transmitter associated with the secondary motion-sensitive acoustic speaker is not actively transmitting; and cause the transmitter of the motion-sensitive acoustic speaker to emit the first motion detection signal such that the active phase of the first motion detection signal occurs within the idle period.

Consistent with the disclosed embodiments, the at least one processing device may further be configured to detect, based on a third motion detection signal received by the at least one receiver, a presence of a tertiary motion-sensitive acoustic speaker in the environment of the motion sensitive acoustic speaker, wherein the tertiary motion-sensitive acoustic speaker is remotely located relative to the motion-sensitive acoustic speaker and wherein the third motion detection signal has an active phase and an idle phase; determine, based on analysis of the second motion detection signal and the third motion detection signal, an idle period during which transmitters associated with the secondary and the tertiary motion-sensitive acoustic speakers are not actively transmitting; and cause the transmitter of the motion-sensitive acoustic speaker to emit the first motion detection signal such that the active phase of the first motion detection signal occurs within the idle period during which the transmitters of the secondary and tertiary motion-sensitive acoustic speakers are not actively transmitting. The at least one processing device may also be configured to cause the at least one transmitter to begin emitting the first motion detection signal after a predetermined delay.

Consistent with the disclosed embodiments, the at least one processing device of the motion-sensitive acoustic speaker may further be configured to differentiate between the first motion detection signal and the second motion detection signal based on at least one characteristic of the second motion detection signal not exhibited by the first motion detection signal. The at least one characteristic may be a frequency associated with the second motion detection signal that is different from a frequency associated with the first motion detection signal. The at least one characteristic may be an amplitude associated with the second motion detection signal that is different from an amplitude associated with the first motion detection signal. The at least one characteristic may also be a phase associated with the second motion detection signal that is different from a phase associated with the first motion detection signal.

Consistent with the disclosed embodiments, the first and second motion detection signals transmitted by the motion-sensitive acoustic speakers may comprise ultrasonic acoustic signals, which may have a frequency of at least 18,000 Hz. The idle period may occur between two active phases of the second motion detection signal and may be determined based on detected on/off transitions associated with active and idle phases of the second motion detection signal, wherein the times associated with the on/off transitions may be determined relative to a local clock associated with the at least one processing device. The idle period may also be determined based on information received from the remote motion-sensitive acoustic speaker, wherein the information may include one or more of a speaker identifier, timing information associated with one or more active phases of the second motion detection signal, a next ON time associated with an active phase of the second motion detection signal, and/or a next OFF time associated with an idle phase of the second motion detection signal. The length of the idle period may also be selectable.

Consistent with the disclosed embodiments, the at least one interface component may include one or more lights, and in response to detection of movement in the environment of the motion-sensitive acoustic speaker, the at least one processing device may be configured to change an illumination state of the one or more lights. The at least one interface component may include a user interface screen, and in response to detection of movement in the environment of the motion-sensitive acoustic speaker, the at least one processing device may be configured to cause at least one change in information or graphics shown on the user interface screen. The at least one interface may also component includes a sound generating element, and in response to detection of movement in the environment of the motion-sensitive acoustic speaker, the at least one processing device is configured to cause the sound generating element to produce an audible tone, wherein the sound generating component may produce no audible tone prior to the detection of movement.

Consistent with the disclosed embodiments, a method of detecting via an acoustic speaker unit and synchronizing motion detection functions of two or more acoustic speaker units is disclosed. The method may comprise causing a transmitter associated with a primary motion-sensitive acoustic speaker unit to emit a first motion detection signal having an active phase and an idle phase; detecting, based on reflections associated with the active phase of the first motion detection signal received by at least one receiver associated with the primary motion-sensitive acoustic speaker unit, movement in an environment of the primary motion-sensitive acoustic speaker; causing a change in a state of an interface component associated with the primary motion-sensitive acoustic speaker unit in response to detection of movement in the environment of the primary motion-sensitive acoustic speaker; detecting, based on a second motion detection signal received by the primary motion-sensitive acoustic speaker, a presence of a secondary motion-sensitive acoustic speaker in the environment of the primary motion-sensitive acoustic speaker, wherein the secondary motion-sensitive acoustic speaker is remotely located relative to the primary motion-sensitive acoustic speaker and wherein the second motion detection signal has an active phase and an idle phase; determining, based on analysis of the second motion detection signal, an idle period associated with the idle phase of the second motion detection signal during which a transmitter associated with the secondary motion-sensitive acoustic speaker is not actively transmitting; and transmitting the first motion detection signal such that the active phase of the first motion detection signal is emitted within the idle period.

Consistent with the disclosed embodiments, the method may further comprise: detecting, based on a third motion detection signal received by the at least one receiver, a presence of a tertiary motion-sensitive acoustic speaker in the environment of the primary motion sensitive acoustic speaker, wherein the tertiary motion-sensitive acoustic speaker is remotely located relative to the motion-sensitive acoustic speaker and wherein the third motion detection signal has an active phase and an idle phase; determining, based on analysis of the second motion detection signal and the third motion detection signal, an idle period during which transmitters associated with the secondary and tertiary motion-sensitive acoustic speakers are not actively transmitting; and causing the transmitter of the primary motion-sensitive acoustic speaker unit to emit the first motion detection signal such that the active phase of the first motion detection signal occurs within the idle period during which the transmitters of the secondary and tertiary motion-sensitive acoustic speakers are not actively transmitting.

Aspects of the disclosed embodiments may include non-transitory, tangible computer-readable media that store software instructions that, when executed at least one processor, are configured for and capable of performing and executing one or more of the methods, operations, and the like consistent with the disclosed embodiments. Also, aspects of the disclosed embodiments may be performed at least one processor that is configured as special-purposes processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF DRAWING(S)

The accompanying drawings, which are incorporated in and constitute a part of this disclosure, illustrate various disclosed embodiments FIG. 1 is a block diagram that illustrates some of the components of a motion-sensitive acoustic speaker consistent with this disclosure.

DETAILED DESCRIPTION

Figure 1:
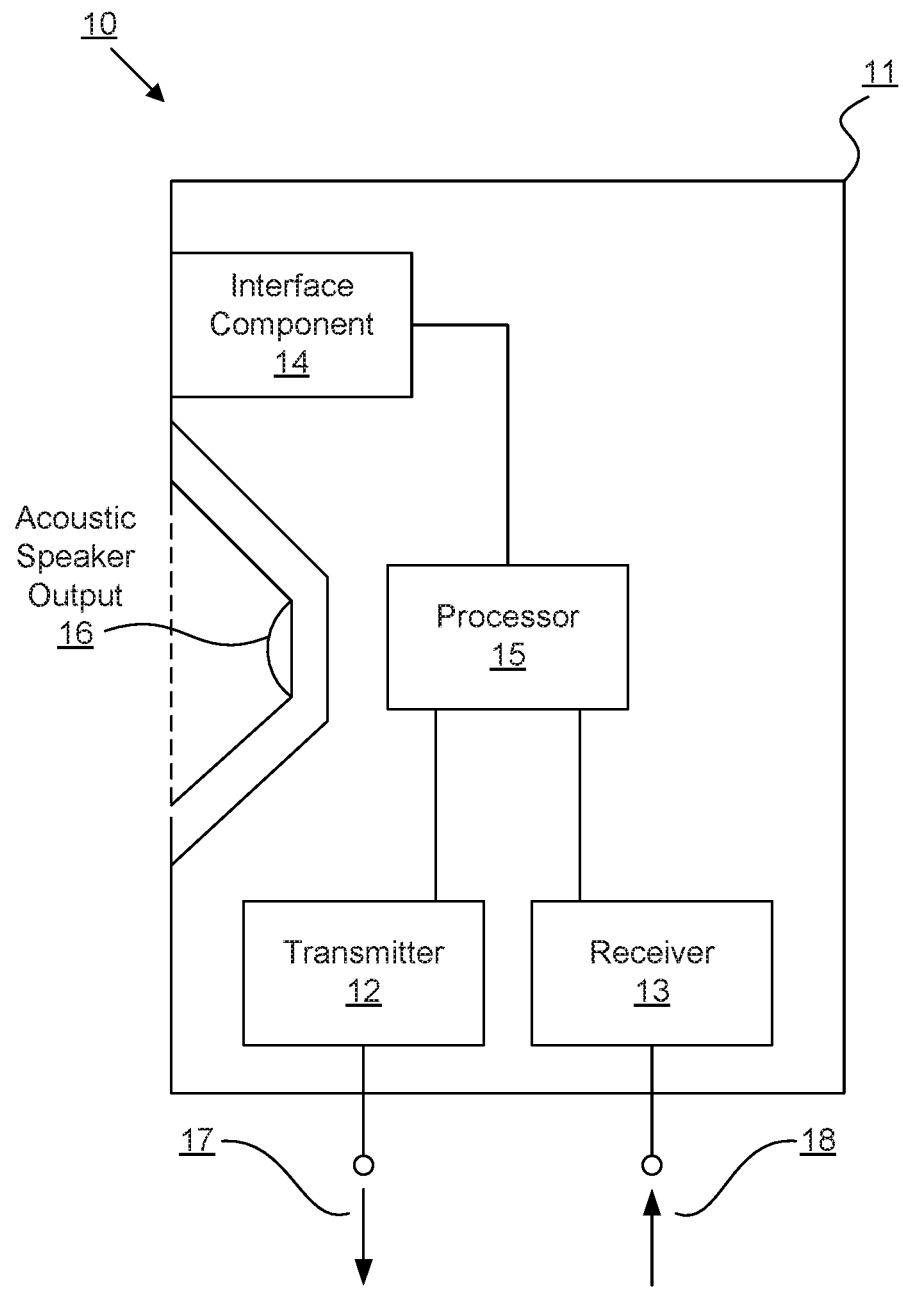

The following detailed description refers to the accompanying drawings. Wherever possible, the same reference numbers are used in the drawings and the following description to refer to the same or similar parts. While several illustrative embodiments are described herein, modifications to, adaptations of, and other implementations of the embodiments are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. The proper scope of the invention is defined by the appended claims.

The disclosed systems and methods relate to a motion-sensitive acoustic speaker, provided with specialized equipment and components, that is capable of automatically and wirelessly synchronizing its motion detection signals with motion detection signals from other motion-sensitive acoustic speakers (e.g., secondary speakers, tertiary speakers, etc.) operating in the same environment as the primary motion-sensitive acoustic speaker. Such operational synchronization between speakers in an environment may enable one or more of the speakers to more accurately or effectively detect moving objects in the environment without interference cause by emissions from other speakers. FIG. 1 provides a block diagram of an exemplary embodiment of a motion-sensitive acoustic speaker 10. The motion-sensitive acoustic speaker 10 may include a housing 11, a transmitter 12, a receiver 13, an interface component 14, a processor 15, and an acoustic speaker output 16. This embodiment may also include any combination of elements or components not illustrated that may be configured, for example, to execute the audio output functions of the speaker or any other desired functions of the speaker unit.

Housing 11 may be constructed of any suitable material. In some embodiments, housing 11 may be constructed of plastic. Alternatively, the housing 11 can be constructed of metal or any other suitable structural material. Housing 11 may be configured according to any desired application of speaker 10. For example, in some cases, housing 11 may include a base or feet, or any other structures or housing extensions, protrusions, etc. for supporting speaker 10 in standalone or upright applications. In other cases, housing 11 may include mounting structures and/or devices for mounting the motion-sensitive acoustic speaker to a wall, ceiling, cabinet, or other surface. Exemplary mounting devices include screws, nails, adhesive, suction cups, magnets, VELCRO, fixing posts, flanged heads of fasteners, and other suitable mounting devices. In this embodiment, the housing 110 may be configured to be mounted under a cabinet or desk, or on a wall or ceiling of a room, closet, attic, basement, garage, cabinet, or in any other indoor or outdoor location where a motion-sensitive acoustic speaker system may be desired. It is to be appreciated that the housing 110 can be any size and/or shape and is not limited to the depicted illustration.

Consistent with this disclosure, a motion-sensitive acoustic speaker may also include a transmitter 12 associated with the housing 11 which may be configured to emit a motion detection signal 17. A motion-sensitive acoustic speaker may also include a receiver 13 configured to receive/detect a reflected motion detection signal 18. Detection of the presence in the environment of a moving object (e.g., a person or other object) may be based on analysis of the received reflected signal 18 relative to the transmitted signal 17 after the transmitted signal 17 interacts with (e.g., reflects from) a moving object. In alternative embodiments, there may be a plurality of transmitters 12 and receivers 13 configured to perform these functions. In yet another embodiment, the transmitter(s) 12 and receiver(s) 13 may be integrated into a single transceiver unit (not shown). In a preferred embodiment, the motion detection signal 17 and reflected motion detection signal 18 may be comprised of ultrasonic acoustic signals which may have a frequency of at least 18,000 Hertz.

Consistent with this disclosure, the motion-sensitive acoustic speaker may also include at least one interface component 14, which may be configured to interact with a user once a moving object is detected in its environment. The interface component may include any type of visual, audible, or tactile device whose state may be changed in response to detected motion in a vicinity of the speaker. In some cases, the change in state may indicate to a user that motion has been detected and/or that the speaker is operational or otherwise ready for use. In some embodiments, an interface component may include one or more lights configured to change an illumination state in response to the detection of a moving object in the environment of the motion-sensitive acoustic speaker. An interface component may also include a power ON visual indicator configured to change an illumination state of the power ON visual indicator in response to the detection of a moving object in the environment of the motion-sensitive acoustic speaker. Additionally or alternatively, an interface component may include a user interface screen configured to change its display of information or graphics in response to the detection of a moving object in the environment of the motion-sensitive acoustic speaker. Further, an interface component may also include a sound generating element configured to produce an audible tone in response to the detection of a moving object in the environment of the motion-sensitive acoustic speaker. In this embodiment, the sound generating element may be configured to produce no audible tone when movement is not present in the environment of the motion-sensitive acoustic speaker. Those skilled in the art will appreciate that the motion-sensitive acoustic speaker may include any combination of or more of the described interface components in addition to any other type of interface component not presently mentioned.

Consistent with this disclosure, the motion-sensitive acoustic speaker (e.g., a host motion-sensitive speaker) may also include a processing device, such as processor 15, configured to control one or many of the disclosed components. Processor 15 may include any hardware-based device capable of executing instructions. In some cases, processor 15 may include an applications processor, a CPU, one or more integrated circuits, FPGAs, DSPs, etc. Processor 15 may have access to one or more memory units (not shown) which may include instructions that, when executing, provide functionality associated with the disclosed speaker units. Such instructions configure the processor 15 as a specialized machine for providing such functionality. In one embodiment, the processor may be configured to cause the transmitter 12 to emit a motion detection signal 17. Further, the processor may be configured to detect, based on reflections associated with the motion detection signal returned via a reflected signal 18 (e.g., including reflections of portions of the motion detection signal off of objects in the vicinity of the host motion-sensitive speaker), a moving object in the environment of the first motion detection signals. Processor 15 may further be configured to command or cause a change of state to one or more interface components 14 in response to motion detection.

Figure 2:
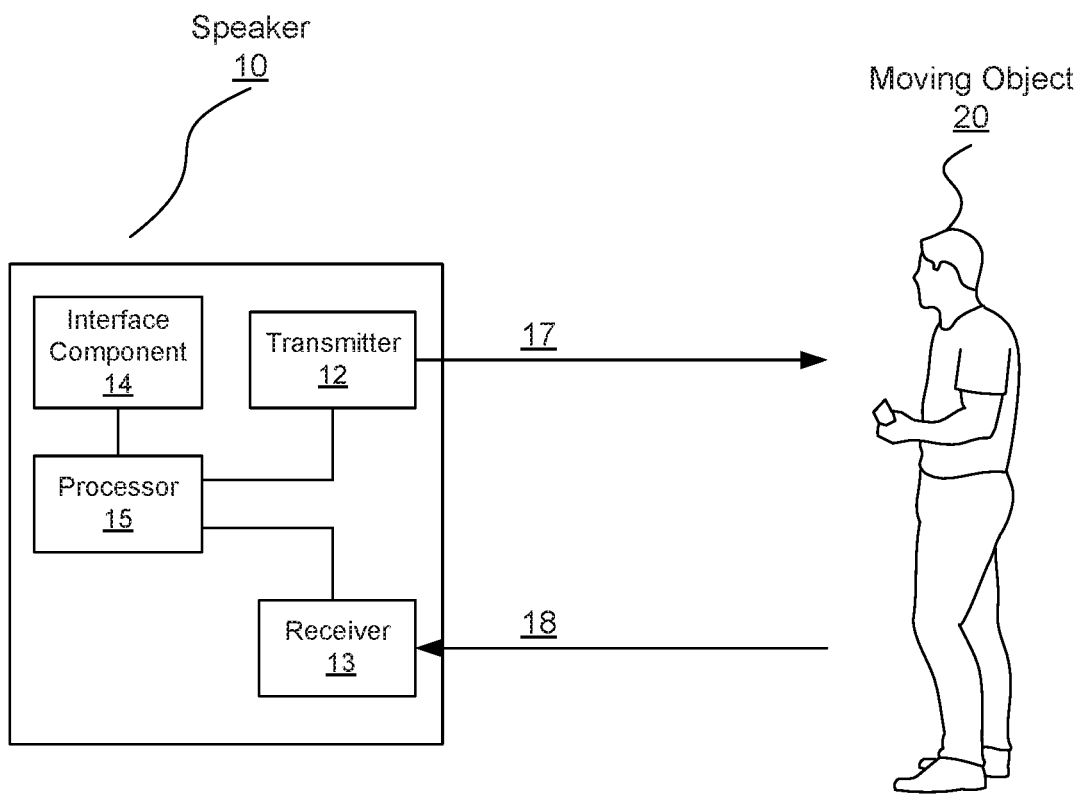
FIG. 2 is a diagram illustrating a motion detection process consistent with the motion-sensitive acoustic speakers of the present disclosure.

FIG. 2 provides a diagram illustrating how an exemplary motion-sensitive acoustic speaker 10 may perform the above-mentioned motion detection functions. For example, processor 15 may be communicatively coupled to transmitter 12 and configured to cause the transmitter 12 or a transceiver to emit a first motion detection signal 17. Motion detection signal 17 may include any suitable waveform for enabling detection of objects and associated motion within an environment of the acoustic speaker. For example, in some cases, the motion detection signal may include an active phase during which ultrasonic waves are transmitted in one or more bursts and echoes of the transmitted waves are received. The frequency of the emitted waves during each burst may be selectable. The burst lengths and "listen" time durations between bursts may also be selectable (e.g., based on the size of the environment in which the speaker is operating and/or based on expected distances of objects in the environment, etc.). Additionally, the number of bursts and corresponding "listen" time intervals occurring during a single active phase of a motion detection signal may also be selectable based on the requirements of a particular application.

An idle phase of the motion detection signal may follow each active phase of the motion detection signal. During the idle phase of a motion detection signal, the transmitter(s) of a particular acoustic speaker associated with the motion detection signal are inactive and not transmitting. Moreover, during the idle phase of the motion detection signal, the one or more sensors responsible for detecting echoes of the signal bursts associated with the active phase may be inactive, as during the idle phase, no additional reflections of the signal bursts from the active phase are expected to be received.

As noted, reflections associated with one or more signal bursts emitted during an active phase of a motion detection signal 17 may be received from an object 20 (e.g., a moving object) and result in a reflected motion detection signal 18. Reflected motion detection signal 18 may be received by receiver 13, which, in turn, can communicate the received signal (or one or more conditioned signals representative of the received motion detection signal 13) to processor 15. The reflected motion detection signal 18 may include an active phase during which echoes of the bursts from the active phase of the motion detection signal are received at receiver 13. The reflected motion detection signal 18 may also include an idle phase during which no reflections resulting from the bursts of the active phase of the motion detection signal are received at receiver 13.

Processor 15 may analyze the received motion detection signal (or other signals provided by the receiver system/unit) and determine the presence of moving object 20 based on analysis of the received signal(s), especially in comparison to the transmitted signal(s). Such detection, for example, may be based on two or more ultrasonic bursts emitted during the active phase of the motion detection signal and corresponding echoes received in response to the two or more ultrasonic bursts. For example, in response to a received motion detection signal 18, an ultrasonic sensor may generate an output signal having a signal strength that varies over time. Each peak in the sensor output signal may represent a received ultrasonic echo from a different object or different object surface in an environment of the speaker. Each signal burst during the active phase of the motion detection signal may result in multiple peaks in the sensor output. Analyzing the times at which these peaks occur in relation to the time of the associated burst can provide times of flight for an ultrasonic burst relative to object(s) in the environment of the speaker. From these times of flight, the distances to the object(s) in the environment may be determined.

Motion of object(s) in the environment of a speaker may be determined by comparing times of flight of a subsequent burst of the motion detection signal relative to the object(s) in the environment. If the times of flight associated with the subsequent burst are different from the earlier recorded times of flight associated with the earlier burst, then motion of the object(s) can be inferred. For example, if the subsequent burst results in a burst echo associated with a particular object that has a time of flight longer than a burst echo received from the object as a result of the earlier burst, the processor may determine that the object is moving away from the speaker. On the other hand, if the subsequent burst results in a burst echo associated with a particular object that has a time of flight shorter than a burst echo received from the object as a result of the earlier burst, the processor may determine that the object is moving toward the speaker. Similar analysis may be performed relative to multiple objects in the environment of the speaker that reflect ultrasonic bursts to receiver 13 as part of a reflected motion detection signal 18. In response to detected motion, processor 15 may cause a change of state in one or more interface component 14 associated with the speaker unit.

In some cases, there may be a need or desire to operate more than one motion sensitive device (e.g., the described host motion sensitive speaker unit) within a common environment. The simultaneous operation of active motion sensing systems (e.g., those including transmitted motion detection signals) may interfere with one another and cause erroneous or inaccurate operation among the motion sensing systems/devices. The presently disclosed motion-sensitive speakers may be configured to address such interference by, for example, synchronizing one or more of the operational aspects of speakers operating in a common environment. For example, consistent with this disclosure, the processing device may be configured to execute a process to synchronize the transmission of a motion detection signal such that an active phase of the motion detection signal occurs during an idle period associated with an idle phase of a motion detection signal of a remotely located secondary motion-sensitive acoustic speaker (e.g., when a transmitter of the remotely located speaker is not active). This synchronization process that may be executed by the processor is discussed in further detail with respect to FIG. 3.

Figure 3:
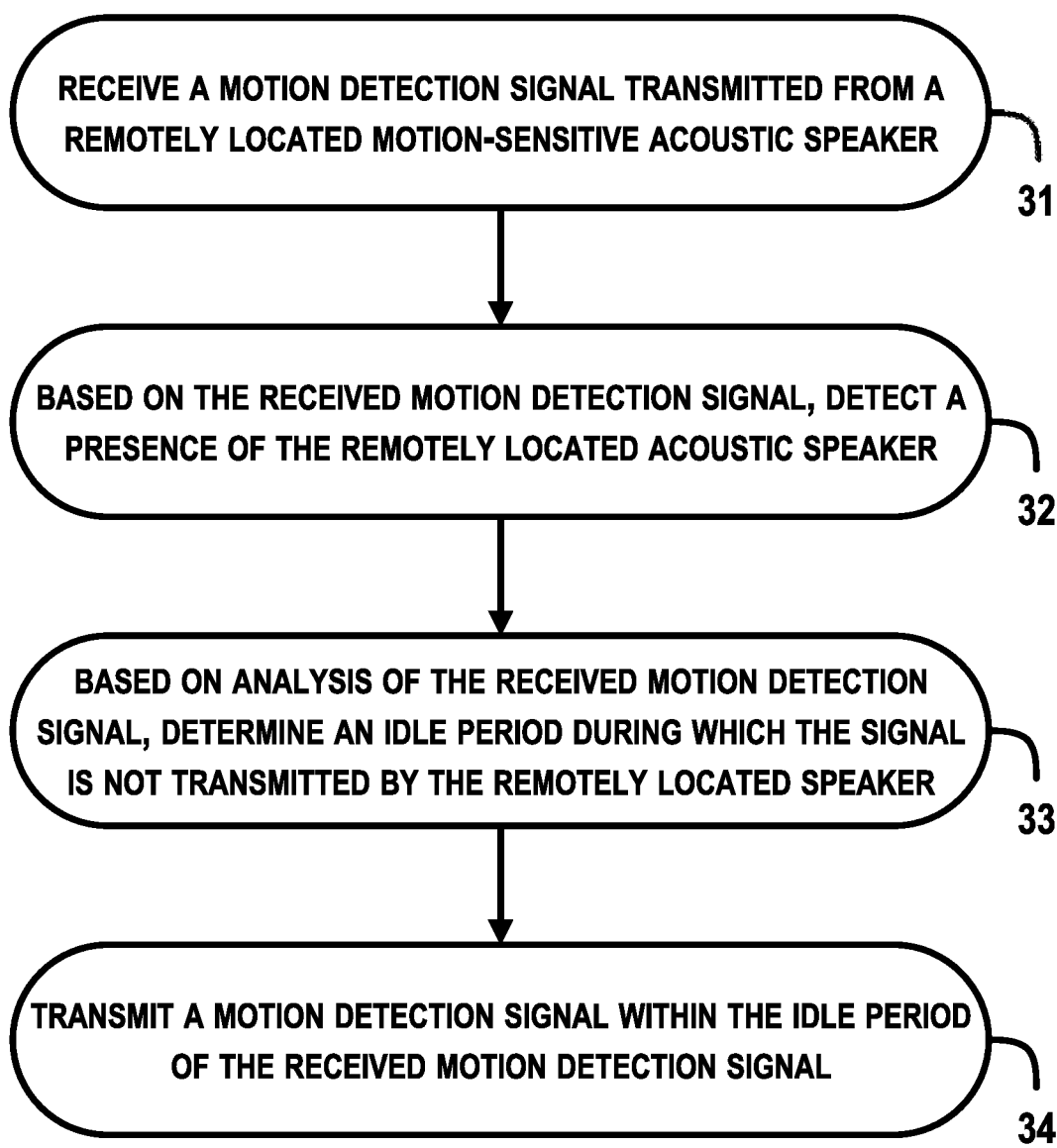
FIG. 3 is a flowchart depicting an exemplary process in which the exemplary disclosed motion-sensitive acoustic speakers may synchronize motion detection signals with remote motion-sensitive acoustic speakers.

FIG. 3 provides a flowchart illustrating a process that may be executed by a motion-sensitive acoustic speaker and/or by one or more of its components. For example, at step 31, a motion-sensitive acoustic speaker (e.g., the host motion-sensitive acoustic speaker) may receive a motion detection signal that has been transmitted by a remote motion-sensitive acoustic speaker in a common environment. During this step, this signal may be received by the receiver of the motion-sensitive acoustic speaker, and this signal or a conditioned version of the signal may be communicated to the processor 15. At step 32, the processor may execute a process to detect the presence of the remotely located motion-sensitive acoustic speaker based on the received motion detection signal. This detection process may be based on, for example, differentiable characteristics of the received motion detection signal (e.g., one or more characteristics of a received motion detection signal that identify that signal as different from emitted signal 17 and/or emanating from a different speaker unit). Alternatively, the detection may be based on speaker identification information transmitted from one speaker unit to another to aid in ascertaining the speakers operational within a certain environment (e.g., a speaker identification code or any other identifying information that may be transmitted by embedding in a motion detection signal, transmitted separately from the motion detection signal, and/or transmitted by any digital or analog wireless communication path). The detection and identification processes are discussed in further detail with reference to FIG. 5. At step 33, the processor may analyze the received motion detection signal to determine one or more time intervals corresponding to idle phases of the received motion detection signal during which the transmitter and sensor of the remote motion-sensitive acoustic speaker are not active. Based on this analysis, at step 34, the processor may then determine one or more time periods during which to emit an active phase of a motion detection signal from the host speaker unit 10 without interference with motion detection signals emitted by other speaker units operating in the vicinity.

As noted, the presence of a remotely located motion-sensitive acoustic speaker may be determined, for example, by processing received motion detection signals with characteristics that are differentiable from characteristics of the motion detection signal emitted by the primary motion-sensitive acoustic speaker. The presence of characteristics of a received motion detection signal that are different from corresponding characteristics of the motion detection signal transmitted by the host may indicate that a different, remotely located motion-sensitive acoustic speaker is transmitting said received signal.

Figure 4:
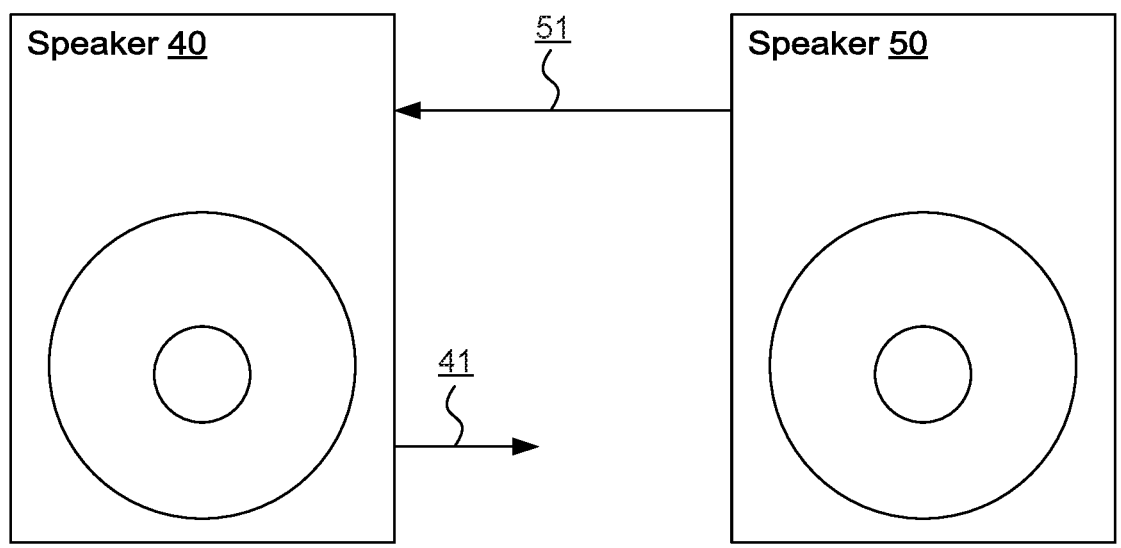
FIG. 4 is a diagram illustrating an example of the synchronization of motion detection signals between two motion-sensitive acoustic speakers.

FIG. 4 provides an illustration of how a primary motion-sensitive acoustic speaker 40 (e.g., a host motion-sensitive speaker) may synchronize motion detection functions with a remotely located motion-sensitive acoustic speaker 50. For example, primary motion-sensitive acoustic speaker 40 may be configured to transmit a motion detection signal 41 through a transmitter and receive reflected motion detection signals through a receiver. When there is an operational remotely located motion-sensitive acoustic speaker 50 in a common environment, however, the receiver may also receive motion detection signal 51 transmitted by speaker 50, reflected motion detection signals as a result of signal 51 reflecting from objects in the environment, reflected motion detection signals resulting from signal 41 reflecting from objects in the environment, etc. Such reception of multiple different motion detection signals and reflected motion detection signals may negatively impact an ability of the processor 15 to accurately detect objects and/or motion in the environment. The processor of speaker 40 may be configured to analyze all received motion detection signals, including signal 51, in order to determine if any signals are differentiable from signal 41. As signal 51 is transmitted from remotely located speaker 50, signal 51 may contain characteristics that are differentiable from the characteristics of signal 41, and the processor of speaker 40 may thereby be able to recognize the presence of remotely located speaker 50.

Figure 5:
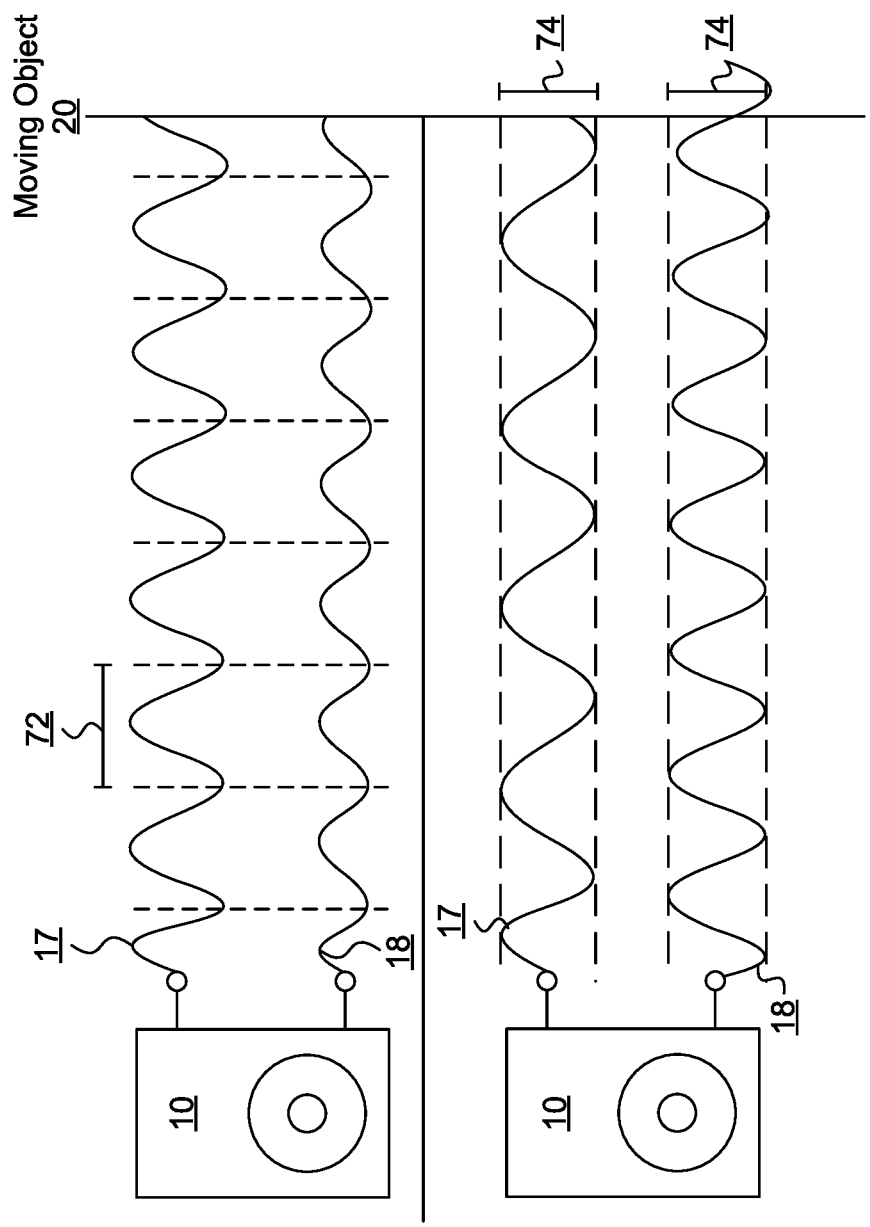
FIG. 5 is a diagram illustrating how different signal characteristics can be utilized in the motion detection functions of the exemplary disclosed motion-sensitive acoustic speaker.

FIG. 5 illustrates exemplary characteristics that may be utilized by the processor to differentiate between two separate motion detection signals. For example, a differentiable characteristic of a burst associated with a motion detection signal (as shown in FIG. 5) may include a frequency 72 associated with one or more bursts of the motion detection signals. For example, each speaker unit may be configured to emit bursts having a certain frequency (e.g., an ultrasonic frequency) that is different from other speakers. It may also be possible for a host speaker unit to modify the frequency of its motion detection signal bursts to be different from other detected motion detection signals. Another differentiable characteristic may include an amplitude 74 associated with the bursts of a motion detection signal. Different speaker units may emit motion detection signals having different burst amplitudes or may be configured to tune the amplitude of the emitted detection signal bursts to be different from other speaker units operating in the environment. A differentiable characteristic may also include a phase associated with bursts of the motion detection signal that is different from a phase of other transmitted motion detection signal bursts. Other characteristics, for example, may include modulated changes in frequency, phase, amplitude, etc.; signal burst times (e.g., a length of time over which an ultrasonic motion detection signal is emitted); burst duty cycles; speaker identifiers encoded in a carrier wave modulated with the detection signal, or any other observable differentiator. Those skilled in the art will appreciate that any combination of one or more of these characteristics may be utilized to differentiate between the first motion detection signal and the second motion detection signal. Additionally, it will be appreciated that motion detection signals may contain other characteristics that may be used to differentiate the first motion detection signal and the second motion detection signal.

Those skilled in the art will appreciate that a process of differentiating characteristics between transmitted and received motion detection signals may not be the exclusive means for recognizing the presence of a remotely located motion-sensitive acoustic speaker. Additionally or alternatively, a motion-sensitive acoustic speaker and/or its components may be configured to transmit, receive, and process signals containing information including, but not limited to, encoded identifiers, modulation patterns, and broadcast identification information. For example, signal 51 transmitted by a remotely located motion-sensitive acoustic speaker may include information such as a speaker ID (either superimposed on a motion detection signal or transmitted separately). The processor of speaker 40 may be configured to process signal 51 to recognize the speaker ID, thereby indicating the presence of speaker 50 in a common environment of speaker 40. The information transmitted through signal 51 may include more than just a speaker ID, including, but not limited to, information regarding active and idle periods of speaker 50, or the next scheduled ON and or OFF times associated with said active and idle periods. It will be appreciated that information transmitted by a motion-sensitive acoustic speaker may not be limited to the types of information discussed in this paragraph, and that the information may be embedded within a motion detection signal consistent with the present disclosure or communicated separately through any other suitable means of communication.

In a process to synchronize the transmission of a motion detection signal with the transmission of another motion detection signal of a remote motion-sensitive acoustic speaker, a host speaker unit may determine time intervals associated with active phases and/or idle phases of detection signals from other speaker units. This way, a motion-sensitive acoustic speaker may be able to determine when to begin transmitting its own motion detection signal so that the active phases of its motion detection signal do not interfere with the other motion detection signal. In some embodiments, this may be achieved by determining time intervals during which the other speaker units in the environment are "active" or "inactive" (e.g., time periods corresponding to the active phases and idle phases of the motion detection signals of the other speaker units in the environment). The term "active" may refer to a state during which a motion detection signal is actively being transmitted, received, and/or processed by a motion-sensitive acoustic speaker (e.g., the active phase). For example, a remote speaker unit may be active during a time when it transmits a motion detection signal. It may also be referred to as active during a period in which it "listens" for echoes of its motion detection signal. The term "inactive" may refer to a state during which a motion detection signal is not being transmitted, received, and/or processed by a motion-sensitive acoustic speaker (e.g., the idle phase). In preferred embodiments, a speaker unit may alternate repeatedly between an active state and an inactive or idle state at a regular periodicity as part of a motion detection cycle. This may enable a host motion-sensitive acoustic speaker to synchronize its motion detection signal with the motion detection signal of a remote unit by setting its own motion detection signal periodicity (or active/idle phase periodicity) such that the active phase of its motion detection signal occurs within an idle period of other speaker units.

Additionally or alternatively to determining time intervals associated with active and idle periods of one or more other speaker units, a determination of when a host motion-sensitive acoustic speaker can transmit a motion detection signal without interference from others may be based on determined ON and/or OFF times associated with the motion detection signal transmissions and/or listen periods of one or more other speaker units. An ON time may correspond to a point in time at which an inactive speaker unit begins transmitting of an active phase of a motion detection signal, whereas an OFF time may correspond to a point in time at which an active speaker unit signal becomes inactive or when an active phase of the motion detection signal ends and an idle phase begins.

Figure 6:
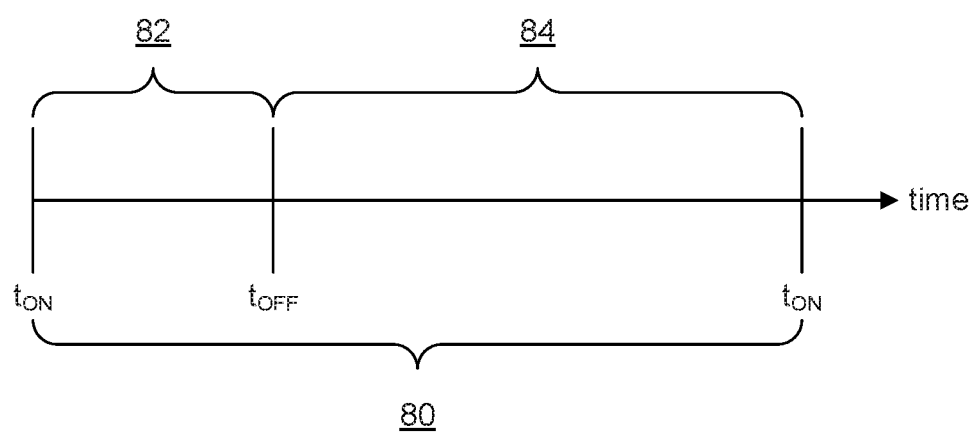
FIG. 6 illustrates an exemplary time period in which the disclosed motion detection signals transmitted by motion-sensitive acoustic speakers may have an idle phase and an active phase.

FIG. 6 provides an illustrative timeline of an exemplary motion detection cycle 80 including an active phase 82 and an idle phase 84 of a motion detection signal. As their names suggest, active phase 82 may correspond to a period of time during which a motion-sensitive speaker unit is in an active state, and idle phase 84 may correspond to a period of time during which the motion-sensitive speaker unit is in an idle state. In preferred embodiments where a motion-sensitive acoustic speaker continuously repeats this cycle during motion detection, idle phase 84 may occur between two active phase 82. In some embodiments, a processor of a host speaker unit, upon detection of a motion detection signal emitted by another speaker unit, for example, may identify the active phase 82 as a period of time over which repeated bursts associated with a motion detection signal are detected from another speaker unit. In such cases, the active phase determination may also include a period of time (known or estimated) during which the other speaker unit continues to detect echoes received from its motion detection signal (e.g., from a last burst associated with an active phase of the motion detection signal).

Additionally or alternatively, this determination of the active phase of another speaker unit may be based on ON and/or OFF times such as $t_{ON\ and}\ t_{OFF}$ as illustrated in FIG. 6. The ON and/or OFF times, for example, may be transmitted from an active speaker unit to another speaker unit (either as part of an emitted motion detection signal or via any wireless communication path). Based on the ON and/or OFF times associated with an active period, processor 15 of a host speaker unit may then determine time intervals corresponding to idle periods of the remote speaker unit (e.g., idle phases of the motion detection signal from the remote speaker unit). Notably, a similar process may be used to determine idle periods of multiple speaker units operating in an environment. This determination may enable processor 15 to set the timing of its own active phase 82, e.g., to occur within the idle period(s) 84 of any of the speaker units operating in the environment. Such operation may reduce or eliminate interference between the host speaker unit and one or more of the remote speaker units operating in the environment of the host speaker unit. Additionally or alternatively, timing information associated with active and/or idle periods of a speaker unit, as previously noted, may be transmitted from a remote motion-sensitive acoustic speaker to the host motion-sensitive acoustic speaker. This information may include one or more of a speaker identifier, timing information associated with one or more active phases of the remote speaker unit, transmission periodicity associated with the active and idle phases of a motion detection signal of the remote speaker, a next ON time associated with an active phase of the motion detection signal of the remote speaker, a next OFF time associated with the active phase of the remote speaker motion detection signal, and/or timing associated with an idle phase of the remote speaker motion detection signal. This information may be embedded within a motion detection signal consistent with the present disclosure or communicated separately through any other suitable means of communication, such as Wi-Fi, Bluetooth®, and/or radio.

Consistent with the present disclosure, the at least one processor of a motion-sensitive acoustic speaker may further be configured to cause the transmitter to emit motion detection signal 41 within the idle period of any of the remote speaker units detected as operating in the environment of the host speaker unit. In preferred embodiments, the processor may achieve this by setting the active phases of its own motion detection signal to have equal length (or shorter length) compared to the active phases of the motion detection signal of a remote speaker unit.

Figure 7:
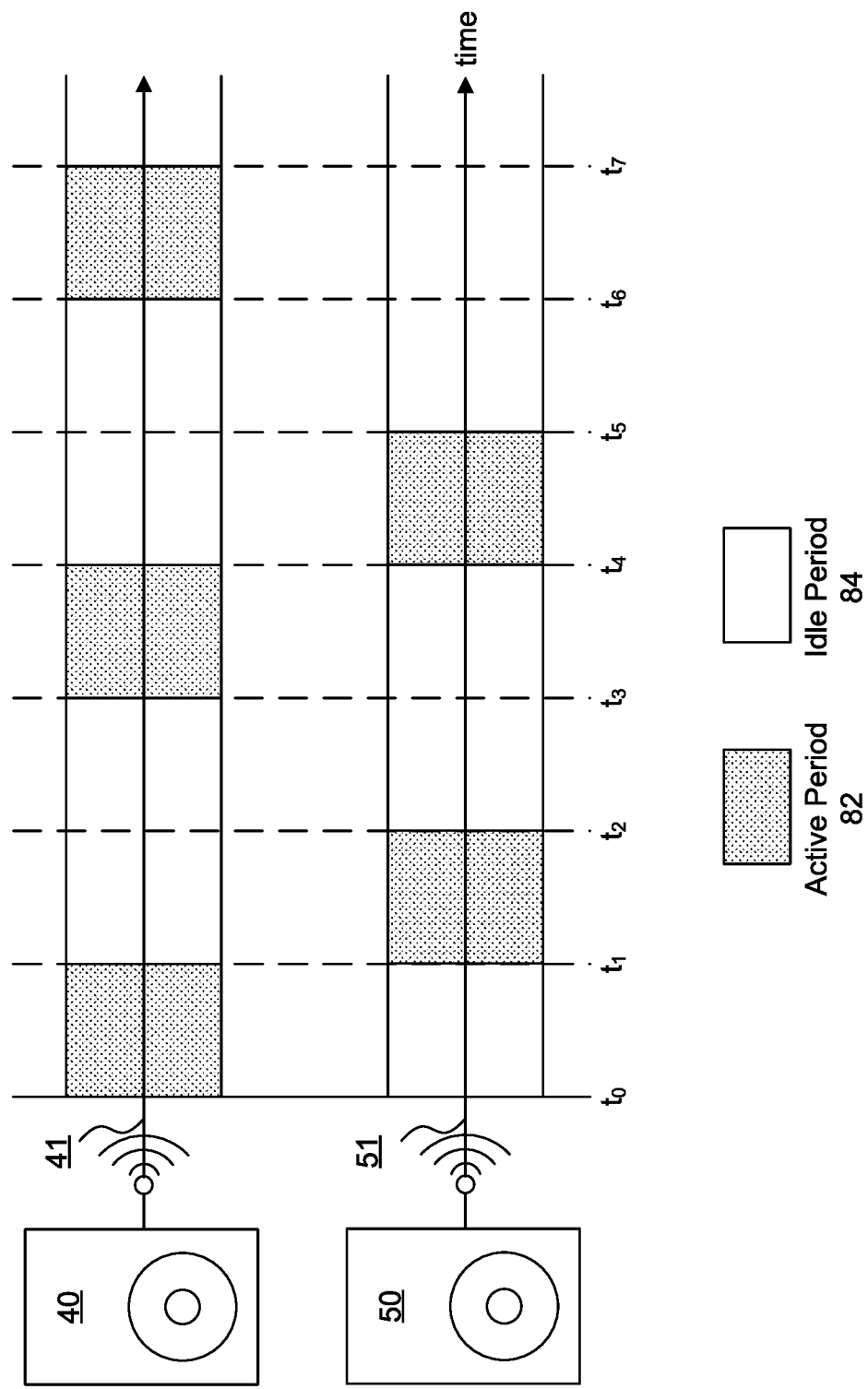
FIG. 7 illustrates exemplary synchronized motion detection signals of two motion-sensitive acoustic speakers.

FIG. 7 provides a diagram illustrating how motion detection signals 41 and 51 may be emitted from motion-sensitive acoustic speakers 40 and 50, respectively, to reduce or eliminate interference by active phases of motion detection signals from the speaker units. In some embodiments, the active phase 82 of speaker 50 may be set to begin at or after an end of active phase 82 of speaker 40 (e.g., during an idle phase of speaker 40). For example, $t_1$ as depicted in FIG. 7 may correspond to the beginning of an idle phase for a motion detection signal from speaker 40 (e.g., once speaker 40 has transmitted an active phase of signal 41 and has finished listening for echoes from objects in its environment). As shown, an active phase of the motion detection signal from speaker 50 may occur within an idle phase of the motion detection signal of speaker 40, but need not occupy the entire idle phase of the speaker 40 motion detection signal. As a result, multiple speaker units may operate by fitting their respective active phases within idle phases of the other speaker units in a common environment. An available idle period associated with one or more speaker units may correspond to at least a portion of an idle phase of a motion detection signal during which no transmitters/sensors from any of the one or more speakers are active. For example, such an idle period is included between times t2 and t3 and between times t5 and t6 in the diagram shown in FIG. 7. Available idle periods may represent time durations during which the active phases of one or more additional speakers may be inserted to increase the number of speaker units available to operate within a certain area without interference from one another.

In some situations, a motion-sensitive acoustic speaker may, upon startup and before initiating emission of its own motion detection signal, listen for another motion detection signal from another speaker unit in the vicinity. If no other motion detection signals are detected, the host speaker unit may be free to operate with any desired active phase and idle phase. In such cases, the processor of the host motion-sensitive acoustic speaker may be configured to cause an emission of a motion detection signal after a predetermined delay. On the other hand, if other speaker units are detected, the processor of the host speaker unit may initiate a synchronization process, as described above, to minimize or eliminate interference among speaker units.

As noted, there may be some situations in which more than two motion sensitive devices (e.g., the described motion sensitive speaker units) may be operating within a common environment. As previously discussed, the presently disclosed motion-sensitive speakers may be configured to address such operation by, for example, synchronizing one or more of the operational aspects of speakers operating in a common environment. Although methods and devices for synchronizing the motion detection signals of motion-sensitive acoustic speaker have been discussed with reference to environments with one or two motion-sensitive acoustic speakers, it will be appreciated that the disclosed devices and methods may be applied to synchronize the motion detection signals of any number of motion-sensitive acoustic speakers within a common environment. For example, consistent with this disclosure, the processing device 15 may be configured to execute a process to synchronize the active phase of the host speaker motion detection signal to occur within overlapping idle phases of motion detection signals of other speaker units (e.g., when all other speaker units are in an idle phase of their respective motion detection signals).

Figure 8:
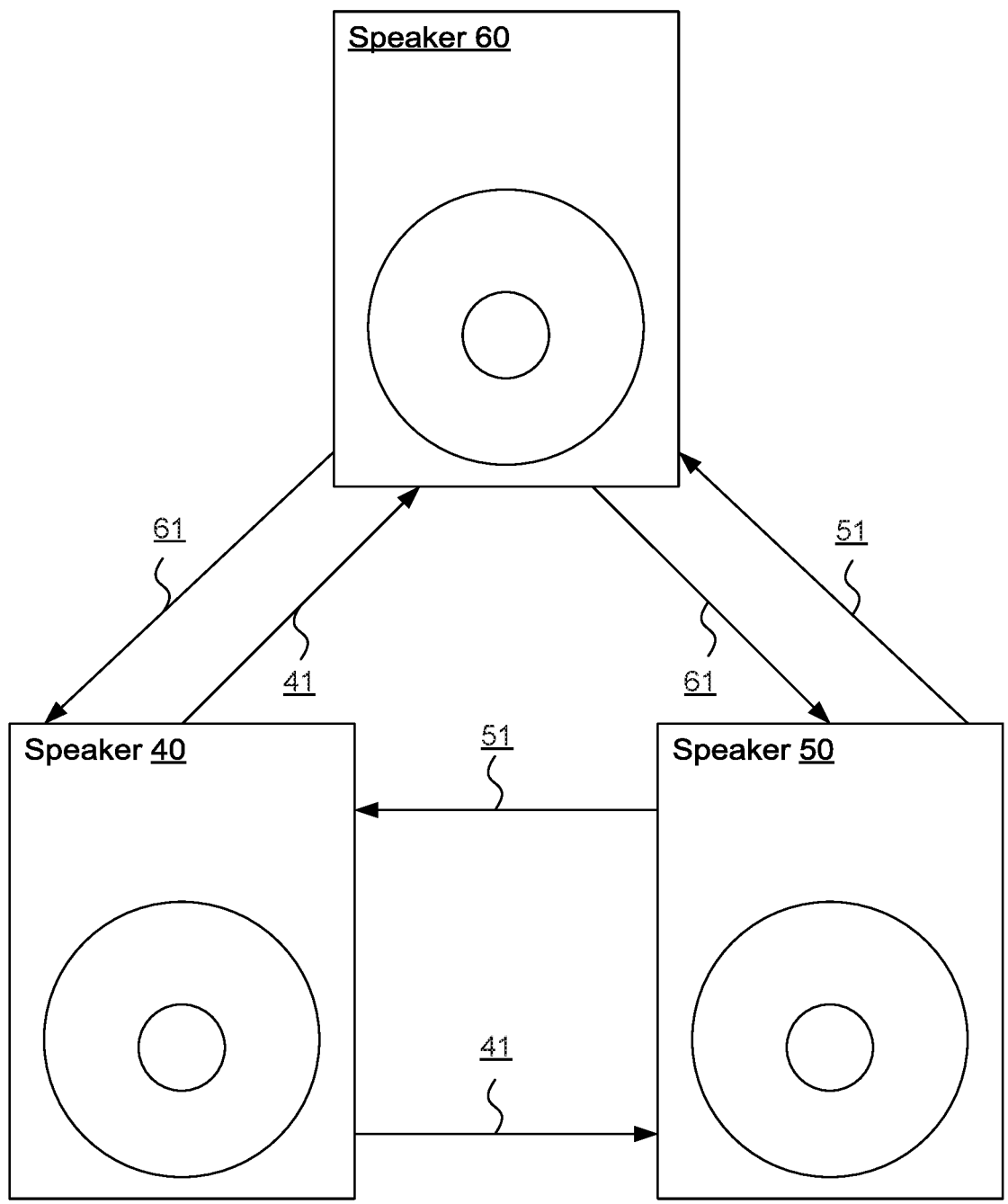
FIG. 8 is a diagram illustrating an example of the synchronization of motion detection signals between three motion-sensitive acoustic speakers.

FIG. 8 provides an illustration of multiple motion-sensitive acoustic speakers operating in a common environment. In such a situation, a processor associated with a host speaker 40 may synchronize the active phases of the motion detection signal of speaker 40 with the idle phases of the motion detection signals of speakers 50 and 60. Conversely, a processor associated with speaker 50 may synchronize the active phases of the motion detection signal of speaker 50 to occur within idle phases of the motion detection signals of speakers 40 and 60. Similarly, a processor associated with speaker 60 may synchronize the active phases of the motion detection signal of speaker 60 to occur within idle phases of the motion detection signals of speakers 40 and 50. In such situations, the first speaker to power on in the environment may be the master, and all following speakers to power on may sync their active phases with the idle phases of the speakers that were earlier to power on. Any other priority scheme may also be used (e.g., such as setting master and slave switches on the speakers operating in the environment, etc.). Such syncing, as described, may be based on detection by speaker 40 of motion detection signals 51 and 61 to determine corresponding active phases and/or idle phases of the motion detection signals of speakers 50 and 60 (and similar operation of speakers 50 and 60 relative to one another). It will be appreciated that the disclosed methods and devices may be applied in situations with more than three motion-sensitive acoustic speakers in a common environment. In some cases, the lengths of time during which a particular speaker unit may be in an active phase or in an idle phase may be adjusted. Such adjustment may, for example, be based on a number of remote speaker units detected to be operational in a particular environment. Where no remote speakers are detected, a processor associated with a host speaker unit may lengthen the active phase of the motion detection signal of the host speaker unit (e.g., the host speaker may remain continuously in an active phase including alternating periods of signal burst transmissions followed by a detection periods during which the processor/sensor may monitor for detected echoes of the transmitted signal bursts). Of course, any other duty cycle of active and idle phases may be used (e.g., 75% active, 25% idle; 50% active, 50% idle; 25% active, 75% idle; etc.).

In cases where other speakers are detected, the active and/or idle phases of a motion detection signal may be adjusted to accommodate the operation of the other speakers. For example, in response to detection of another speaker that has powered on, a host speaker may decrease its active phase and increase a time associated with its idle phase. Such an adjustment may facilitate the other speaker unit or units to locate a suitable time period during an idle phase of the host speaker and any other speakers operating in the vicinity. In some cases, however, the length of an active phase and/or an idle phase may be set during the manufacturing of a motion-sensitive acoustic speaker or of its components. In other embodiments, the length of the active and idle phases may be selected during operation of the motion-sensitive acoustic speakers (e.g., based on user input). For example, the length of active and idle phases may be selected either manually by the user (e.g., through the interface component), or they may be selected automatically by the at least one processor of the motion-sensitive acoustic speakers, as described above.

Figure 9:
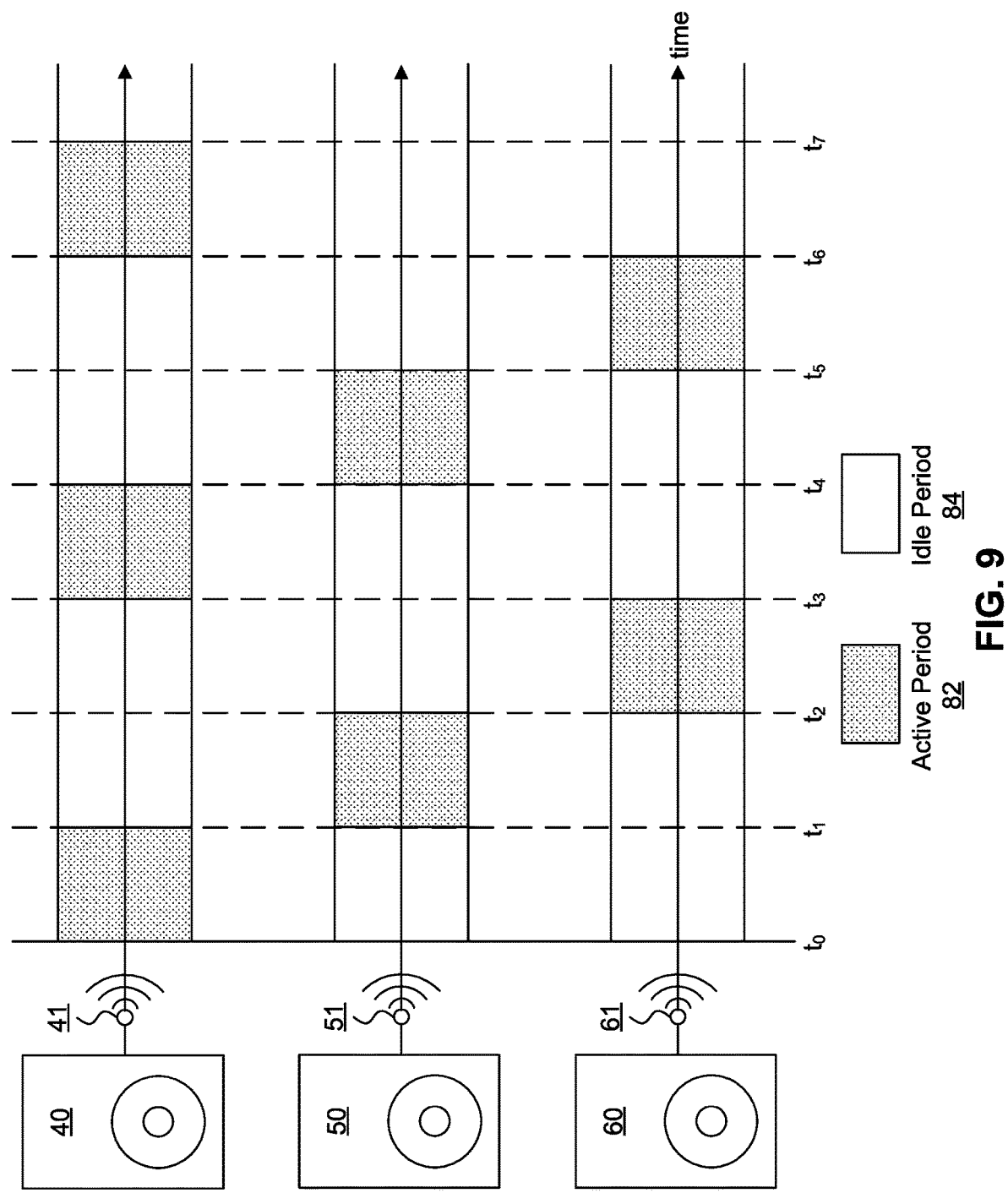
FIG. 9 illustrates exemplary synchronized motion detection signals of three motion-sensitive acoustic speakers.

FIG. 9 provides a diagram illustrating an exemplary result of synchronizing motion detection signals 41, 51, and 61 and corresponding active and idle phases of speakers 41, 51, and 61 using the disclosed methods and devices. As shown, motion detection signals from each speaker unit may have at least one active phase 82 occurring during a time interval during which the other speakers are in an idle phase. In some embodiments, the active and idle phases of each motion-sensitive acoustic speaker may be selected so that the active phases 82 of each motion-sensitive acoustic speaker begin immediately upon the ending of an active phase 82 of another speaker. For example, speaker 40 may have an ON time at $t_0$, and an OFF time at $t_1$, delineating an active phase of the motion detection signal emitted by speaker 40. Speaker 50 may then have an active phase that begins at or after the OFF time of speaker 40 at $t_1$. Speaker 50 may have an OFF time at $t_2$, at which time (or after) speaker 60 may initiate an active phase of its motion detection signal. In some cases, one or more speaker units may adjust the active phase of their motion detection signal to substantially fill an entire idle phase of one or more other speaker units.

The described methods and devices may be varied and are not limited to the examples or descriptions provided. In some embodiments, some or all of the logic for the above-described techniques may be implemented as a computer program or application, as a plug-in module or sub-component of another application, or as hardware components.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. The claims are to be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

What is claimed is:

1. A motion-sensitive acoustic speaker, comprising:
a housing;
at least one transmitter associated with the housing;
at least one receiver associated with the housing;
at least one interface component associated with the housing; and
at least one processing device configured to:
cause the at least one transmitter to emit a first motion detection signal having an active phase and an idle phase;
detect, based on reflections associated with the active phase of the first motion detection signal received by the at least one receiver, movement in an environment of the motion-sensitive acoustic speaker;
cause a change in a state of the at least one interface component in response to detection of movement in the environment of the motion-sensitive acoustic speaker;
detect, based on a second motion detection signal received by the at least one receiver, a presence of a secondary motion-sensitive acoustic speaker in the environment of the motion sensitive acoustic speaker, wherein the secondary motion-sensitive acoustic speaker is remotely located relative to the motion-sensitive acoustic speaker and wherein the second motion detection signal has an active phase and an idle phase;
determine, based on analysis of the second motion detection signal, an idle period associated with the idle phase of the second motion detection signal during which a transmitter associated with the secondary motion-sensitive acoustic speaker is not actively transmitting; and
cause the at least one transmitter of the motion-sensitive acoustic speaker to emit the first motion detection signal such that the active phase of the first motion detection signal occurs within the idle period.

2. The motion-sensitive acoustic speaker of claim 1, wherein the at least one transmitter and the at least one receiver are included in a common transceiver unit.

3. The motion-sensitive acoustic speaker of claim 1, wherein the first and second motion detection signals comprise ultrasonic acoustic signals.

4. The motion-sensitive acoustic speaker of claim 1, wherein the idle period occurs between two active phases of the second motion detection signal.

5. The motion-sensitive acoustic speaker of claim 1, wherein the idle period is determined based on one or more detected on/off transitions between the active phase and the idle phase of the second motion detection signal.

6. The motion-sensitive acoustic speaker of claim 5, wherein times associated with the on/off transitions are determined relative to a local clock associated with the at least one processing device.

7. The motion-sensitive acoustic speaker of claim 5, wherein the idle period is determined based on information received from the secondary motion-sensitive acoustic speaker.

8. The motion-sensitive acoustic speaker of claim 7, wherein the information includes one or more of a speaker identifier, timing information associated with one or more active phases of the second motion detection signal, transmission periodicity associated with the second motion detection signal, a next ON time associated with the active phase of the second motion detection signal, and/or a next OFF time associated with the idle phase of the second motion detection signal.

9. The motion-sensitive acoustic speaker of claim 1, wherein the at least one processing device is configured to differentiate between the first motion detection signal and the second motion detection signal based on at least one characteristic of the second motion detection signal not exhibited by the first motion detection signal.

10. The motion-sensitive acoustic speaker of claim 9, wherein the at least one characteristic is a frequency associated with the second motion detection signal that is different from a frequency associated with the first motion detection signal.

11. The motion-sensitive acoustic speaker of claim 9, wherein the at least one characteristic is an amplitude associated with the second motion detection signal that is different from an amplitude associated with the first motion detection signal.

12. The motion-sensitive acoustic speaker of claim 9, wherein the at least one characteristic is a phase associated with the second motion detection signal that is different from a phase associated with the first motion detection signal.

13. The motion-sensitive acoustic speaker of claim 1, wherein the at least one interface component includes one or more lights, and in response to detection of movement in the environment of the motion-sensitive acoustic speaker, the at least one processing device is configured to change an illumination state of the one or more lights.

14. The motion-sensitive acoustic speaker of claim 1, wherein the at least one interface component includes a power ON visual indicator, and in response to detection of movement in the environment of the motion-sensitive acoustic speaker, the at least one processing device is configured to change an illumination state of the power ON visual indicator.

15. The motion-sensitive acoustic speaker of claim 1, wherein the at least one interface component includes a user interface screen, and in response to detection of movement in the environment of the motion-sensitive acoustic speaker, the at least one processing device is configured to cause at least one change in information or graphics shown on the user interface screen.

16. The motion-sensitive acoustic speaker of claim 1, wherein the at least one interface component includes a sound generating element, and in response to detection of movement in the environment of the motion-sensitive acoustic speaker, the at least one processing device is configured to cause the sound generating element to produce an audible tone.

17. The motion-sensing acoustic speaker of claim 1, wherein at least one of a length of the idle phase of the first motion detection signal and a length of the active phase of the first motion detection signal is selectable.

18. The motion-sensing acoustic speaker of claim 1, wherein the at least one processing device is further configured to:
detect, based on a third motion detection signal received by the at least one receiver, a presence of a tertiary motion-sensitive acoustic speaker in the environment of the motion sensitive acoustic speaker, wherein the tertiary motion-sensitive acoustic speaker is remotely located relative to the motion-sensitive acoustic speaker and wherein the third motion detection signal has an active phase and an idle phase;

determine, based on analysis of the second motion detection signal and the third motion detection signal, an idle period during which transmitters associated with the secondary and the tertiary motion-sensitive acoustic speakers are not actively transmitting; and cause the at least one transmitter of the motion-sensitive acoustic speaker to emit the first motion detection signal such that the active phase of the first motion detection signal occurs within the idle period during which the transmitters of the secondary and tertiary motion-sensitive acoustic speakers are not actively transmitting.

19. The motion-sensing acoustic speaker of claim 1, wherein the first motion detection signal comprises ultrasonic sound waves at a frequency of at least 18,000 Hz.

20. The motion-sensing acoustic speaker of claim 1, wherein the at least one processing device is configured to cause the at least one transmitter to begin emitting the first motion detection signal after a predetermined delay.

21. A method of detecting motion via an acoustic speaker unit and synchronizing motion detection functions of two or more acoustic speaker units, the method comprising:

causing a transmitter associated with a primary motion-sensitive acoustic speaker unit to emit a first motion detection signal having an active phase and an idle phase;

detecting, based on reflections associated with the active phase of the first motion detection signal received by at least one receiver associated with the primary motion-sensitive acoustic speaker unit, movement in an environment of the primary motion-sensitive acoustic speaker;

causing a change in a state of an interface component associated with the primary motion-sensitive acoustic speaker unit in response to detection of movement in the environment of the primary motion-sensitive acoustic speaker;

detecting, based on a second motion detection signal received by the primary motion-sensitive acoustic speaker, a presence of a secondary motion-sensitive acoustic speaker in the environment of the primary motion-sensitive acoustic speaker, wherein the secondary motion-sensitive acoustic speaker is remotely located relative to the primary motion-sensitive acoustic speaker and wherein the second motion detection signal has an active phase and an idle phase;

determining, based on analysis of the second motion detection signal, an idle period associated with the idle phase of the second motion detection signal during which a transmitter associated with the secondary motion-sensitive acoustic speaker is not actively transmitting; and transmitting the first motion detection signal such that the active phase of the first motion detection signal is emitted within the idle period.

22. The method of claim 21, further comprising:

detecting, based on a third motion detection signal received by the at least one receiver, a presence of a tertiary motion-sensitive acoustic speaker in the environment of the primary motion sensitive acoustic speaker, wherein the tertiary motion-sensitive acoustic speaker is remotely located relative to the motion-sensitive acoustic speaker and wherein the third motion detection signal has an active phase and an idle phase;

determining, based on analysis of the second motion detection signal and the third motion detection signal, an idle period during which transmitters associated with the secondary and tertiary motion-sensitive acoustic speakers are not actively transmitting; and causing the transmitter of the primary motion-sensitive acoustic speaker unit to emit the first motion detection signal such that the active phase of the first motion detection signal occurs within the idle period during which the transmitters of the secondary and tertiary motion-sensitive acoustic speakers are not actively transmitting.

* * * * *